United States Patent [19]

Belmares-Sarabia et al.

[11] 4,410,908
[45] Oct. 18, 1983

[54] LUMINANCE SIGNAL GENERATOR FOR COLOR FILM SCANNER

[75] Inventors: Armand Belmares-Sarabia, Oak Beach, N.Y.; Stanley J. Chayka, Parsippany, N.J.

[73] Assignee: Corporate Communications Consultants, Holbrook, N.Y.

[21] Appl. No.: 232,142

[22] Filed: Feb. 6, 1981

[51] Int. Cl.³ .................... H04N 9/52; H04N 9/11
[52] U.S. Cl. ................................. 358/30; 358/54; 358/76
[58] Field of Search ............... 358/30, 32, 54, 76, 358/80

[56] References Cited

U.S. PATENT DOCUMENTS

| | | | |
|---|---|---|---|
| 2,684,995 | 7/1954 | Schroeder | 358/30 |
| 2,892,025 | 6/1959 | Luther et al. | |
| 2,903,506 | 9/1959 | Livingston | 358/30 |
| 3,558,806 | 1/1971 | Monahan et al. | |
| 4,096,523 | 6/1978 | Belmares-Sarabia et al. | 358/80 |

OTHER PUBLICATIONS

Color Correction Techniques for Television Cameras, by John F. Monahan and Robert A. Dischert, "Journal of the SMPTE," vol. 78, Sep. 1969, pp. 696-700.

*Primary Examiner*—John C. Martin
*Attorney, Agent, or Firm*—Gregor N. Neff

[57] ABSTRACT

This invention is an improvement upon the system and method shown in the "Rainbow" U.S. Pat. No. 4,096,523. A special luminance compensation signal is formed by combining the color derivative signals (yellow, green, red, blue, cyan and magenta) with one another. The compensation signal so formed is combined with the luminance signal from a standard luminance matrix. The overall luminance signal is used in the usual way to form video picture signals. The individual color derivative components of the luminance signal can be varied independently of one another. This provides an improved degree of control and correction of video color signals, and corrects for some film errors which previously have not been adequately corrected. Preferably, the gain, pedestal and gamma factors of the overall luminance signal also can be controlled independently. It also is preferred that the primary color component signals delivered to the standard luminance matrix be taken from the output of the gain section of the signal processor for each of the primary color component signals. A special gamma control circuit is provided by means of which it is possible to provide continuous variation of the gamma factor from values substantially less than one to values substantially greater than one. This is done by means of a single circuit which also has excellent noise suppression properties.

22 Claims, 4 Drawing Figures

LUMINANCE SIGNAL GENERATOR FOR COLOR FILM SCANNER

This invention relates to the processing of color video signals, and particularly to the color correction of such signals. This patent application describes improvements upon the color correction system and method described in the "Rainbow" U.S. Pat. No. 4,096,523 (hereinafter referred to as the "Rainbow system") whose disclosure is incorporated herein by reference.

Although the color correction provided by the Rainbow system is excellent and is believed to be unsurpassed by anything prior to it, even further improvements in the art of color correction are desirable and necessary.

One of the problems which has not been solved adequately in the past is the occurrence of luminance errors due to the dyes used in motion picture film. Luminance errors in the film are produced by several different causes, but errors due to the nature of the dyes appear to be among the most serious. Accordingly, it is one object of the invention to provide improved luminance control and correction in video color correction, and particularly to ameliorate or eliminate the luminance errors caused by the dyes in the motion picture film.

Applicants have discovered that the foregoing objects can be met and that new and surprisingly significant color corrections can be produced by providing for the individual variation of the color derivatives of the signals used to form the luminance signal in the correction system. Preferably, an overall luminance signal is developed by combining the individually variable color derivative signals with the output signal from a standard luminance matrix.

A continuing problem is the complexity, stability and cost of video circuits. Accordingly, it is another object of the invention to provide a video processing system with circuits which are simpler, less costly, more stable, and easier to use than in the past.

The foregoing objects are met in accordance with a further feature of the invention in which the signals used to devleop the standard luminance signal from a standard matrix are taken from the outputs of the gain sections of the individual processors for the primary color component signals. This avoids the need for additional amplifiers for the signals delivered to the matrix, and makes an unexpected improvement in the performance and ease of using the color correction system.

The latter objects also are met by the provision of a gamma control circuit in which the non-linear output of a variable-gain amplifier is modified by a circuit which, in effect, alters the waveform of the output signal so as to alter the gamma factor of the circuit. Preferably, this is done by combining with the amplifier's output a modifying signal which is proportional to that output signal, but in a sense so as to oppose that output signal. The modifying signal can be varied in magnitude and polarity. This circuit is able to provide a gamma factor which can be varied continuously from a value of less than one to a value greater than one.

The foregoing and other objects and advantage of the invention will be described in or apparent from the following description and drawings. In the drawings.

GENERAL DESCRIPTION

Figure 1:
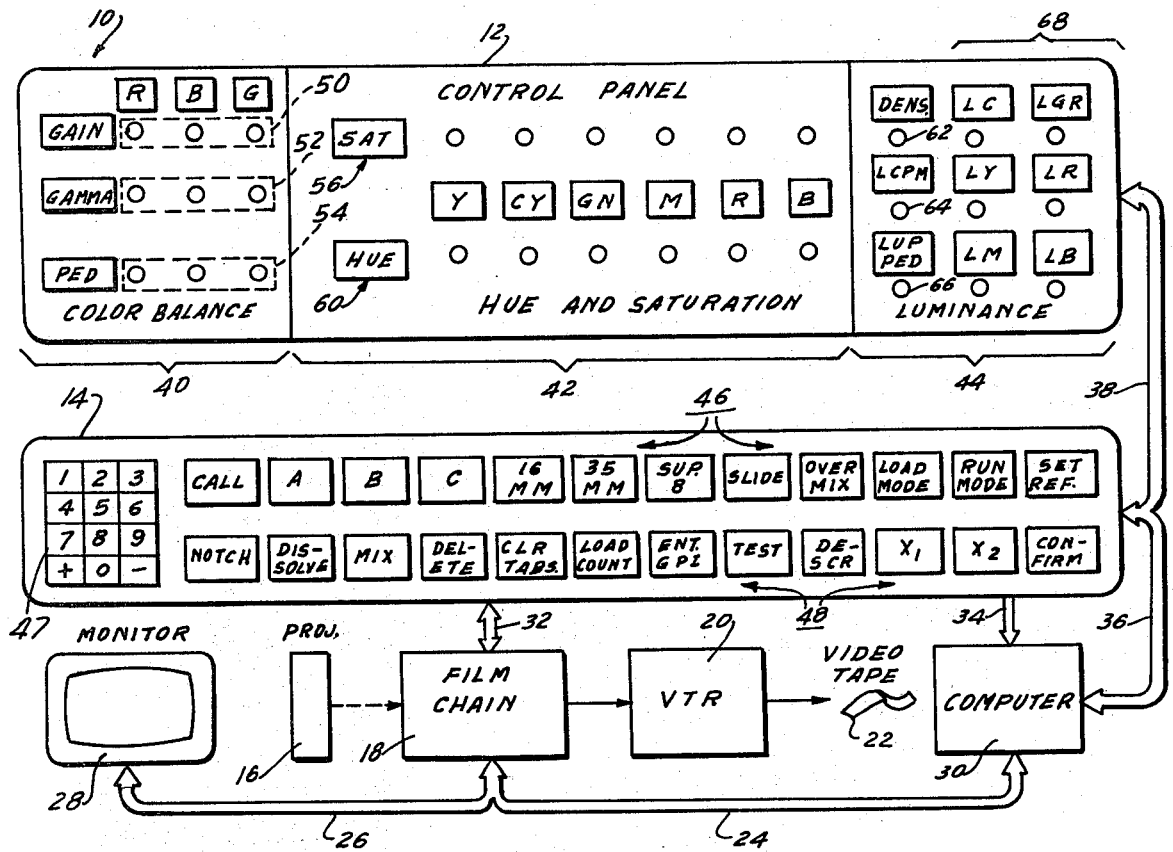
FIG. 1 is a schematic diagram of a color correcting system constructed in accordance with the present invention.

The color correcting system 10 shown in FIG. 1 includes a motion picture projector 16 which delivers color motion picture images to a film chain 18 which converts the visible images into video signals. Control units 12 and 14 are provided, together with a computer 30 and interconnecting cables 24, 26, 32, 34, 36 and 38, to control the color correction of the video signals. The color-corrected video signals then are delivered to a video tape recorder 20 which produces a color-corrected video tape record 22 of the program.

It should be understood that the invention is not limited to the use of a film chain as a source of video picture signals. The source also can be a video tape player, a film scanner of the flying-spot type or photodiode type, or video camera, or any other means for developing or storing color video signals. As another alternative, the output of the system can be delivered directly to a transmitter for broadcasting rather than to a video information storage device.

The full details of the system 10 have not been set forth in this description since they are described sufficiently in the "Rainbow" patent mentioned above. Reference should be made to that patent for further details.

CONTROL PANELS

The control panel of the control unit 12 includes a group 40 of color balance controls, a group 42 of hue and saturation controls, and a group 44 of luminance controls. The color balance, hue and saturation controls are substantially the same as the corresponding controls described in the "Rainbow" patent. A row of three potentiometers 50 is provided for adjusting and correcting the gain of "R", "B" and "G" (red, blue and green) signals in the film chain. Similarly, a row 52 of three potentiometers is provided to correct the gamma of the R, B and G signals, and a third row 54 of potentiometers is provided to correct the pedestal factor of those signals.

Two rows 56 and 60, consisting of six potentiometers each, are provided, one for adjusting the saturation and one for adjusting the hue of the six color derivative signals, yellow, cyan, green, magenta, red and blue.

The luminance controls 44 are new. The controls on the panel 44 include a "Density" potentiometer 62, a potentiometer 64 labeled "LCPM," and a "Luminance Pedestal" potentiometer 66. Also included is a group of six potentiometers 68 each of which controls separately one of the color derivative components of the luminance signal, as it will be described in greater detail below.

The "Density" potentiometer 62 controls the gain of the overall luminance signal. The "LCPM" potentiometer 64 ("LCPM" stands for "Luminance Convolution Processing Mode") is the gamma control potentiometer for the overall luminance signal, and the pedestal potentiometer 66 is the pedestal control for the overall luminance signal.

The control panel of the other control unit 14 includes a key-set 47 and two rows 46 and 48 of function control switches. The function control switches have the same purpose as the corresponding function control switches disclosed in the "Rainbow" patent, with the exceptions noted in the discussion which follows. The general operation of this system now will be described briefly.

OPERATION

When a motion picture film is to be corrected, the first step in operating the system is to set reference values for the color corrections. Thus, the "set reference" button on the lower panel 14 is pressed, a piece of test film is run in the projector, or a standard gray scale is used, and the various control potentiometers are adjusted until a pleasing picture is obtained. Then, the values set by the potentiometers are entered in memory by pressing the "confirm" button, and the machine is ready to correct film.

The film to be corrected is placed in the projector 16, and the machine is adapted for use with the film by pressing a corresponding pushbutton "16 mm," "35 mm," "Super 8", or "slide". The film chain 18 converts the visual images into video signals and displays a corresponding video picture on the screen of the monitor 28.

When the film has been positioned so that the first frame is displayed, or some other frame desired for use as a starting frame is displayed, the "Load Count" and "Confirm" buttons are pushed to reset the frame counter to zero. Then the film is run until a scene needing correction is displayed. The projector is stopped, and the "Notch" switch is pressed to identify the frame with an "event number", which then is stored in memory. The color corrections which are applied to the picture displayed on the monitor screen are the reference corrections set in the first step of operation. If any of the corrections is not satisfactory, the color control potentiometers on the control panel 12 can be adjusted until the picture is pleasing. When this has been done, the adjusted color component values are stored in the memory of the computer 30 by pressing the "Mix" button. The reference values which did not require any adjustment are used without change, thus saving the labor of re-setting all corrections for every scene. Depressing the "Mix" button automatically transfers the new correction values to the camera so that the camera now displays a picture using the adjusted values.

If the corrections are unsatisfactory, they may be repeated by again pressing the "Mix" button (after operating an "Active/Memory" switch, not shown, to enable adjustment by use of the potentiometers), and then entering the new values by pressing the "Confirm" button.

This procedure then can be repeated for each other scene or frame needing color correction, so that event numbers and corrections are stored in memory for every scene or frame to be corrected.

Pushing the "Call" pushbutton activates the key pad 47 and enables it to enter the event numbers of two previous "events" (color corrections) into one of a pair of buffer memories "A" and "B". Subsequently, the operator can compare the effects of the "A" corrections or the "B" corrections applied to prior frames with the corrections currently applied by pressing the "A" or the "B" button or the "C" button (for the current corrections), and the operator can use any of the three corrections to correct the picture, thus further saving the labor of completely re-correcting each scene.

When it is desired to produce a color-corrected video-tape, the projector is rewound, one of the projector selection buttons is pushed, the video tape recorder 20 is turned on, and either the "Run Mode" or the "Load Mode" button is pushed. In either case, corrected color component values previously stored are read out of memory under the control of the frame counter in the computer so as to deliver color-corrected signals to the video tape recorder 20 to produce a fully color-corrected video tape 22. If the "Run Mode" button is pushed, the potentiometers are activated and can be used to change the color corrections as the video tape is being prepared. Pressing the "Load Mode" button enables the operator to preview, enter or delete any event, but not to change corrections while recording on tape. Pressing the "Run Mode" button disables the "Load Mode" button, and vice-versa.

Pressing the "Over Mix" button allows the operator to activate the control panel while the system is applying corrections from the memory of the computer. This permits the operator to "trim" the corrections stored in memory.

The "Dissolve" button when pressed identifies the frame with an event number. The dissolve function creates a unique incremental correction for each frame until the next event's frame count is encountered. The difference between the previous correction and the following correction is divided by the length of the dissolve in frames so as to generate the incremental correction per frame required.

The "Delete" button can be used to delete the current event from memory. For safety's sake, the "Confirm" button also must be pushed in order to complete deletion.

The "Clear Tables" button can be used to clear from memory all events from a prior correction.

The "Enter GPI" button is used to enter in memory instructions for the operation of auxiliary equipment such as switchers, audio systems, etc., or for projector "animation" (operation of the projector to produce special effects). Pressing the "Enter GPI" button enables a "General Purpose Interface" which permits the use of the keypad 47 to store instructions in memory together with any color correction information, so that the instructions will be carried out when the event location is detected during recording of a video tape record.

The "Test" button is used to call up diagnostic routines and to allow testing of the operation of the machine without changing its settings.

The "Descratch" button activates circuitry which will mask scratches in the film by masking image enhancement in the area of that scratch.

The "$X_1$" and "$X_2$" buttons are spares which can be used to enable an optical "mag follow-through" operation or other optional functions.

Accordingly, the system shown in FIG. 1 can be used to quickly and efficiently color-correct motion picture film or video signals from other sources and produce a color-corrected video tape.

It should be understood that the term "color correction" herein includes the creation of additional new color combinations some of which, it is believed, may not be possible with prior equipment.

FILM CHAIN

Figure 3:
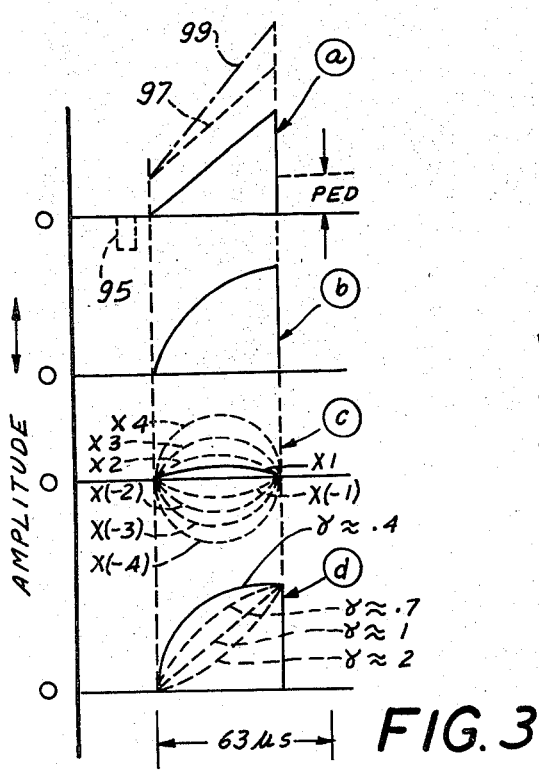
FIG. 3 is a diagram illustrating the waveforms of certain electrical signals produced in the circuit of FIG. 2.
Figure 2:
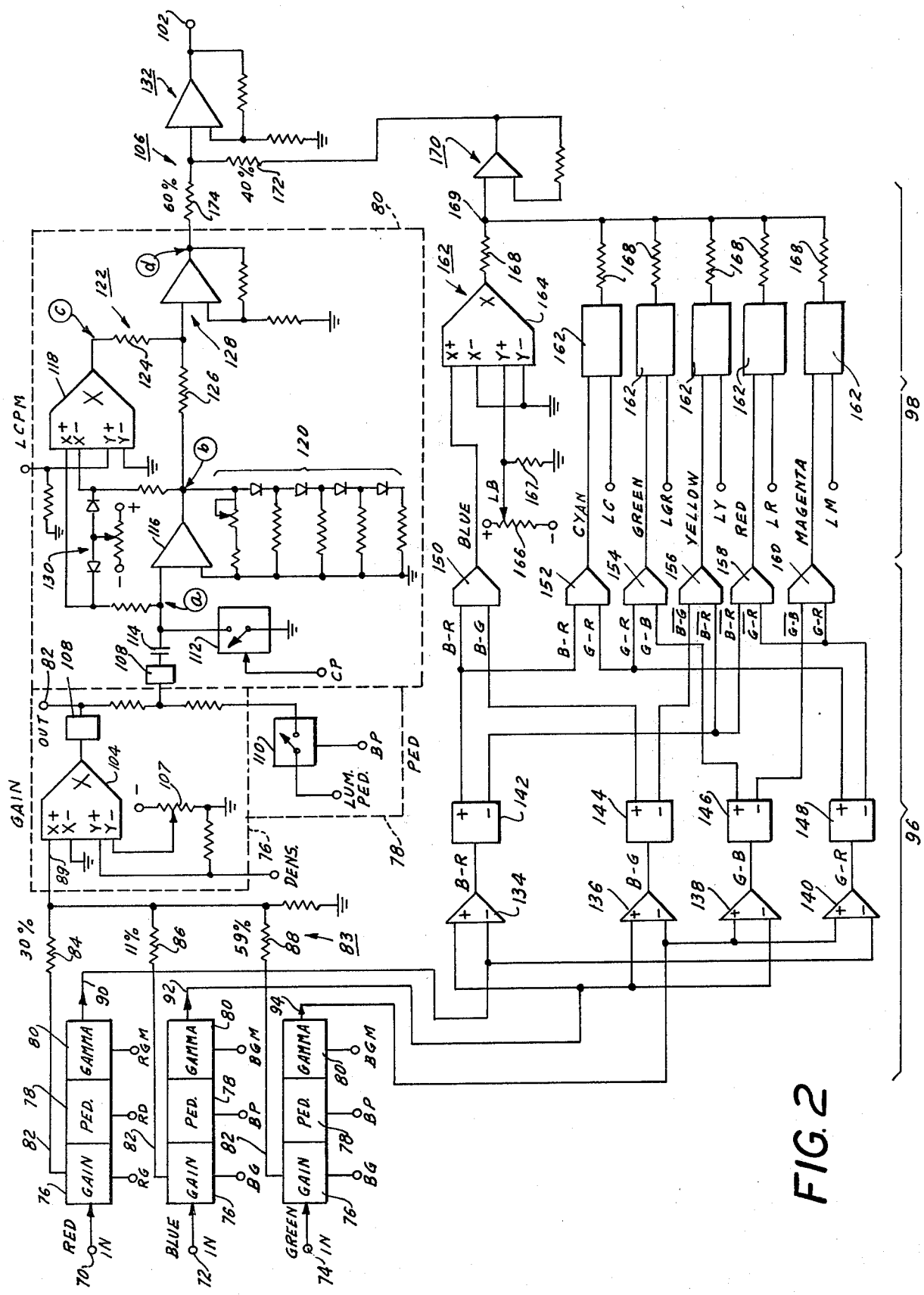
FIG. 2 is a schematic circuit diagram of a portion of the system shown in FIG. 1.

FIG. 2 shows a portion of the electrical circuit of the film chain 18. The remainder of the film chain is substantially the same as shown in FIG. 3 of the "Rainbow" patent and will not be described in detail here.

FIG. 2 shows the new luminance control circuit and the novel gamma control circuit of the present invention.

LUMINANCE CONTROL CIRCUIT

The primary color component signals, red, blue, and green, are received on input leads 70, 72 and 74, respectively, from the video pickup tubes (not shown). Each of the primary color component signals is processed by a processor including a gain section 76, a pedestal section 78 and a gamma section 80.

The output of the gain section 76 of each processor is delivered over a lead 82 to a standard luminance resistor matrix 83 consisting of resistors 84, 86 and 88 connected as shown to receive the red, blue or green signals, respectively. The values of the resistors 84, 86 and 88 bear the same relationship to one another as the percentages next to each of the resistors in the drawings.

The luminance signal from the matrix 83, which can be called the "primary" luminance signal, is delivered over an output lead 89 to the gain section 76 of a luminance signal processor, which also includes a pedestal section 78 connected to receive the output of the gain section 76, and a gamma control section 80 connected to receive the output of the pedestal and gain sections. The gain, pedestal, and gamma sections of the luminance signal processor have been given the same reference numerals as the corresponding parts of the primary color component signal processors because those parts are identical. The details of sections 76, 78 and 80 are shown only once in order to avoid unnecessary repetition.

The output of the gamma section 80 is delivered to a summing network 106 which consists of resistors 172 and 174. At the junction 106, the primary luminance signal from the standard matrix 83 is combined with (added to) a compensating luminance signal from a luminance color derivative control circuit 98.

The circuit 98 receives signals corresponding to the blue, cyan, green, yellow, red and magenta color derivatives of the red, blue and green primary color components of the video signals. These derivative signals are supplied by a color separator circuit 96.

The outputs of the gamma sections 80 of the red, blue and green processors are delivered over lines 90, 92 and 94, respectively, to the input of the color separator circuit 96. These signals are delivered to the inverting or non-inverting input leads of four differential operational amplifiers 134, 136, 138 and 140 connected in the specific pattern shown. This pattern is designed to produce output signals from the differential amplifiers having the characteristics indicated by the letters such as "B-R" at the output of the amplifier 134. That is, the output from amplifier 134 is proportional to the difference between the blue and red primary color component signals.

The output from each of the differential amplifiers is delivered to one of four rectifier circuits 142, 144, 146 and 148. The positive portions of voltages received by these rectifiers are delivered over the "+" output leads, and the negative portions of the waves are delivered over the "−" output leads. These output leads are interconnected in the specific pattern shown so as to produce input signals having the characteristics noted by the letters at the input leads of six summing amplifiers 150, 152, 154, 156, 158 and 160. The symbol "B-R" (for example) indicates that the input signal on that lead is proportional to the difference between the Blue and Red signals. The bars over the symbols on the input leads for the amplifiers 156, 158 and 160 are used to indicate that the signals received on those lines are from the negative output leads of the rectifiers, and are not used as in the usual digital notation to indicate inverted signals.

Each summing amplifier sums its input signals and produces an output signal respresentative of the blue, cyan, green, yellow, red or magenta color derivative. Each of these signals represents a portion of the video picture where the corresponding color derivative and only that derivative appears. In other words, at each point in the video picture, if a plurality of different colors appear at that point, there will be no output from any of the summing amplifiers.

The color derivative control circuit 98 includes six analog multiplier circuits 162, each connected to receive one of the color derivative signals. Only one of the circuits 162, the circuit for the blue signal, is shown in detail in FIG. 2.

The circuit 162 includes a four-quadrant analog multiplier circuit 164. Such a circuit has the capability of multiplying video-frequency signals received on its X+ and its X− terminals by a d.c. signal applied on its Y+ and Y− input terminals. At it is well known, such a device will accept d.c. signals of either polarity.

The control circuit 162 also includes the luminance blue potentiometer 166 and a reference resistor 167 connected to the Y+ terminal. The X− and Y− terminals are connected to ground, and the X+ terminal is connected to receive the output of the blue summing amplifier 150.

Connected at the output of each of the multipliers 164 is a resistor 168. The output leads from the resistors 168 are connected together at a summing node 169 which is the input lead of an amplifier 170. The resistors 168 are of identical values so that the different color derivative signals are added together in equal proportion at the summing node 169. The amplifier 170 has a gain appropriate for compensating for the voltage loss due to the network of resistors 168. That is, preferably, it has a gain of six to compensate for division of the signal amplitude by six due to the network of resistors 168.

The output of the amplifier 170 is delivered through the resistor 172 to the summing node 106. The node 106 is one input lead of an output amplifier 132 which produces an overall luminance signal on an output lead 102.

The overall luminance signal on terminal 102 is utilized in the film chain in the same manner as the overall luminance signal appearing on line 204 is used in the circuit of FIG. 3 of the "Rainbow" patent. That is, the overall luminance signal is combined with "I" and "Q" and "I" and "Q'" signals appropriately modified to produce hue and saturation corrections, in order to provide a color-corrected video signal to deliver to the video tape recorder 20.

One of the principal problems which the foregoing circuit arrangement solves is the correction of dye errors in motion picture film. The applicants have discovered that the luminance errors due to the dyes are superimposed upon one another in a non-linear manner and are frequency-dependent. By means of the above-described circuit, each of the color derivative signals is varied independently of the other so as to separately restore each color derivative component of the luminance signal. The resulting signal then is combined with the standard luminance signal as a means of compensating for luminance errors more completely than in the past. The result is greatly improved color correction and the provision of a means for accurately compensating for dye errors.

Another novel feature of the luminance circuit is that the signals used to feed the luminance matrix 83 are taken from the outputs of the gain sections 76 of the primary component processors. In the past, it was known to take such signals either from the output of the gamma section 80, or directly from the input lines 70, 72 or 74. To take the output from the gamma section 80 was found to be undesirable because variation of the gamma for the red signals, for example, automatically would create corresponding variations in the luminance signal, even though this result might not be desired. In the prior circuits in which the luminance signals were derived directly from the input terminals 70, 72, etc., an additional gain control stage was required. By taking the luminance signal for the matrix 83 from the output of the gain stage 76, not only has the need for three additional amplifiers been eliminated, but also it has been found that this change makes the color correction system easier to operate.

Figure 4:
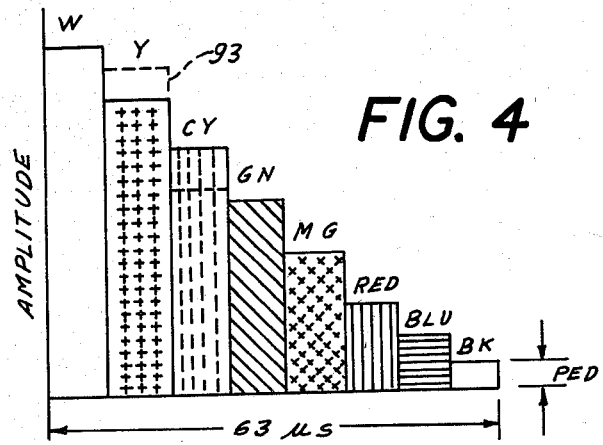
FIG. 4 is a graphic representation of the relative magnitude of color derivative signals developed by means of the circuit of FIG. 2.

FIG. 4 shows a "color bars" display illustrating the operation of the luminance circuit of the invention. The various vertical bars represent the relative magnitudes of the yellow, cyan, green, magenta, red, blue, white and black signals during one horizontal sweep interval. As it is indicated by the dashed line 93, the yellow signal can be increased independently of each of the other signals. The same is true for each of the other signals. This is not true in the prior art, where the control of either the red, green or blue signal would effect two or more of the color derivative signals. Thus, in the prior art, it was not possible to provide the independent variation and correction of luminance which is so helpful with the dye luminance error problem discussed above.

GAIN CONTROL CIRCUIT

The gain control circuit 76 includes a four-quadrant analog multiplier circuit 104. The luminance signal on lead 89 is conducted to the X+ terminal of the multiplier. A bias network 107 is connected between the Y+ and the Y− input terminals. The "Density" input terminal is connected to the Y− input terminal. Thus, the luminance signal is multiplied by the D.C. "Density" signal, and the output signal magnitude is controlled by the input D.C. "Density" signal.

PEDESTAL CIRCUIT

The output signal of the gain stage is coupled through an emitter-follower impedance-matching circuit 108 to a field-effect transistor ("FET") switch 110 of the pedestal circuit 78. A D.C. pedestal signal is conducted to the circuit, as shown, through the FET switch 110 when it is turned on. The FET 110 is turned on only during the time duration of the blanking pulse, which is supplied on the "BP" input line. This has the effect of setting the zero reference level for the video signals being processed.

GAMMA CONTROL CIRCUIT

The output of the pedestal circuit is delivered through another emitter-follower impedance-matching circuit 108 and a coupling capacitor 114 to the noninverting input terminal of differential operational amplifier 116 forming a part of the gamma circuit control 80.

The "gamma factor", as that term is used in this description, is defined by the following equation:

$$\gamma = (\ln V_o / \ln V_{in})$$

In which:
Vin = Input voltage to the circuit
Vo = Output voltage
$\gamma$ = Gamma factor At the input of the gamma control circuit 80 is another FET switch 112 which is turned on by a clamping pulse 95 (see FIG. 3) delivered over a line "CP". The clamping pulse is supplied during the blanking pulse interval and sets of zero reference level, within the blanking interval, in order to avoid D.C. offset.

Connected between the inverting input terminal and the output of the operational amplifier 116 is a feedback network 120 of resistors connected in parallel with one another by diodes. Each of the diodes is of a type which is set to conduct at a voltage higher than the voltage at which the diode preceeding it conducts, so that different resistors are successively connected into the circuit as the output voltage increases. This has the effect of giving the output of the amplifier a non-linear, convex waveform and produces a gamma factor of less than one for the circuit 80.

In order to explain the foregoing more clearly, reference now will be made to FIG. 3, which is a waveform diagram illustrating the waveforms of various signals in the gamma circuit 80. The encircled lower case letters in FIG. 3 identify the waveforms of signals appearing at the correspondingly-labeled points of the gamma circuit 80 in FIG. 2.

Waveform "a" shows the ramp waveform which appears at the input of amplifier 116. This represents one cycle of the horizontal sweep voltage, and the 63 microsecond time interval marked on the horizontal axis of FIG. 3 is the time interval of one video line. The waveform 97 shown in dashed outline is the result of the application of a pedestal signal indicated by the letters "PED". In other words, the entire wave is increased in amplitude by a constant factor.

The additional waveform 99 is the result of increasing the gain of the gain control circuit 76. The negative pulse 95 is the clamping pulse applied to the lead CP.

The signal "b" is the signal at the output of the amplifier 116. The curvature illustrates the operation of the feedback circuit 120 to produce a convex waveform. As it will be readily recognized by those skilled in the art, this curve has a gamma factor of less than one.

Sometimes it is desirable to have a gamma factor equal to or greater than one. For example, it usually is necessary to have a gamma factor of less than one for positive film, and a gamma factor greater than one for negative film. It can be seen that the amplifier 116 with its feedback network 120 will not produce a gamma factor greater than one; that is, it will not produce a concave curve like the curve "d" in FIG. 3 which has a gamma factor of two. In the past, it usually has been necessary to provide two separate circuits to give gamma factors both less than and greater than one, and then selectively connect the circuits manually, as needed. In accordance with one aspect of the present invention, such complexity and the associated delay is avoided by the provision of a compensating circuit, shown in FIG. 2, consisting of a four-quadrant analog multiplier circuit 118 with one of its X terminals connected to the non-inverting input of amplifier 116, and the other of its X terminals connected to the output of amplifier 116. Thus, the input on the X terminals of multiplier 118 is the difference between the input and output signals of the amplifier 116.

Applied to the Y terminals of the multiplier 118 is the D.C. control signal "LCPM". Thus, the multiplier 118 multiplies the signal across the amplifier 116 by the valve of a D.C. control signal. That signal can be either positive or negative. The resulting output signal from the multiplier is shown at "c" in FIG. 3. The waveform "c" is a family of curves illustrating the use of different positive and negative multiplication factors. The multiplication factor for each curve is marked adjacent to the curve. As it can be seen, the output from the multiplier 118 has a curvature corresponding to the curvature produced by the amplifier 116. The direction and degree of curvature depend upon the magnitude and polarity of the D.C. control signal.

At the input of the multiplier 118 is a "coring" adjustment circuit 130 which includes a pair of high-frequency diodes connected between the X input leads, and a potentiometer. This circuit 130 is a bias circuit which prevents the multiplier 118 from operating on very low level signals, for well-known reasons.

The outputs of the amplifier 116 and multiplier 118 are delivered to a summing network 122 consisting of resistors 124 and 126. The sum of those signals is delivered to an output amplifier 128. The output of that amplifier is illustrated in curve "d" in FIG. 3. As it can be seen, this curve exhibits gamma factors both below and above one, and also a gamma factor equal to one. These varying gamma factors are provided simply by selection of the magnitude and polarity of the D.C. control signal applied to the terminal LCPM. The gamma factor is variable in a continuous manner between the maximum and minimum limits.

The gamma circuit 80 used to control the gamma factor of the luminance signal also is used in the last stage of each of the processors for the red, blue and green primary color component signals. Therefore, one of the advantages of the novel gamma control circuit of the invention is that it makes it practical to use a gamma greater than one in one channel, and a gamma less than one in the others, or vice-versa. This can be important to correct for certain types of color defects.

NOISE REDUCTION

The gamma control circuit 80 has the further advantage that it provides good noise suppression without extra filters or the like. The differential amplifier 116 is a wide-band type of amplifier; that is, it has a relatively wide bandwidth at relatively low gain. However, it has a narrower bandwidth at relatively high gains. Also, the diodes in the matrix 120 act like small capacitors to signals of video frequency. Thus, the circuit 120 acts as a filter which makes the bandwidth even lower at high gain settings of the amplifier 116. This characteristic is beneficial in that it tends to filter out noise caused by graininess in the motion picture film used as a source. Thus, the circuit provides less noise for lower gamma values (higher gains), which is the reverse of most prior circuits.

A certain amount of noise cancellation effect also is provided by the multiplier circuit 118 itself because it has a relatively narrow bandwidth at high gain and a wider bandwidth at low gain.

The combination of the amplifier 116 and the multiplier 118 has a noise-cancelling effect caused by the fact that any noise which appears in the signal across the amplifier 116 also appears in the input of the multiplier 118, and this signal is added in series opposition to the output of the amplifier 116. Thus, many noise signals tend to be cancelled out.

PREFERRED COMPONENTS

In a device which has been build and successfully tested in accordance with the present invention, each of the multiplier circuits 118, 104 and 164 preferably is a four-quadrant multiplier, part number MC 1595 L sold by Motorola Corporation. Also, the wide band amplifier 116 preferably is a wide band differential operational amplifier, part number CA 3100 made by RCA. All of the other components are conventional.

The foregoing invention meets the objectives set forth in the beginning of this specification. The invention provides luminance control which is not believed to have been attained in the past. This control capability makes it possible to correct for dye-created errors and other significant errors in the film.

The luminance circuit is simpler and easier to adjust than prior circuits because of the manner in which the standard luminance signal for the standard matrix is derived.

A gamma control circuit is provided which is substantially simpler than past circuits capable of similar performance. In addition, the gamma circuit provides continuous variability of the gamma factor between values substantially above and substantially below one. This allows new combinations of gamma circuits in the control of the color components of the video signals. The gamma circuit also automatically minimizes noise.

In short, the art of color correcting video signals has been advanced by a significant step.

The above description of the invention is intended to be illustrative and not limiting. Various changes or modifications in the embodiments described may occur to those skilled in the art and these can be made without departing from the spirit or scope of the invention.

We claim:

1. Color compensating luminance control means comprising means for developing primary color component video signals representative of images stored by an image recording medium, difference signals corresponding to the differences between said primary color component signals, and a plurality of color derivative signals comprising selective combinations of said difference signals, means for individually varying each of said color derivative signals independently of further color information signals derived to represent said images, and combining means for combining the individually variable color derivative signals to form a luminance signal.

2. A device as in claim 1 including means for combining said primary color component signals in a predetermined ratio to produce a second luminance signal, and means for combining the first-named luminance signal with said second luminance signal to form a composite luminance signal.

3. A device as in claim 2 including means for individually varying each of said primary color component signals.

4. In a device for color correcting color video picture signals, means for developing a primary luminance signal, compensating means for developing a compensating luminance signal, said compensating means including means for developing color derivative signals comprising selective combinations of primary color component difference signals, control means for individually varying each of said color derivative signals independently of further color information signals derived to represent said video picture signals, means for combining said color derivative signals to form said compensating luminance signal, and means for combining said primary and compensating luminance signals to form an overall luminance signal for use in producing color-corrected video signals.

5. A device as in claim 4 including means for varying the gamma factor of said overall luminance signal.

6. A device as in claim 5 in which said last-named means is adapted to vary the gamma factor of said overall luminance signal by varying the gamma factor of said primary luminance signal.

7. A device as in claim 4 including means for varying the amplitude and/or pedestal of said overall luminance signal by varying the amplitude and/or pedestal of said primary luminance signal.

8. A device as in claim 4 in which said color derivative signals include yellow, green cyan, blue, magenta and red signals.

9. A device as in claim 4 in which said control means includes a D.C.-controllable multiplier circuit for multiplying said color derivative signal by a D.C. signal.

10. A device as in claim 2 including gamma processing means for altering the gamma factor of each of said primary color component signals, said combining means including means for combining said primary color component signals prior to their being altered by said gamma processing means.

11. A device as in claim 10 including gain and pedestal processing means for altering the amplification and pedestal factors, respectively of each of said primary color component signals, said combining means comprising means for combining the output signals from said gain processing means.

12. A method of color correcting video picture signals, said method comprising the steps of forming from said picture signals color derivative signals comprising selective combinations of primary component difference signals, combining said color derivative signals to form a luminance signal, combining said luminance signal with other color signals to form color-corrected video signals, and including the step of separately varying the magnitude of said color derivative signals independently of said other color signals in color correcting said video picture signals.

13. A method as in claim 12 in which said color derivative signals include yellow, green, cyan, blue, magenta and red signals.

14. A method as in claim 12 including the steps of separating the uncorrected video signals into primary color components, combining said primary color components to form a primary luminance signal, and combining said primary luminance signal with said color derivative signals to form said luminance signal.

15. A method as in claim 12 including the steps of displaying an uncorrected video picture formed by uncorrected ones of said video picture signals, utilizing said varying step to color correct said picture, storing corrected signals corresponding to the magnitudes of said color derivative signals after being so varied, repeating said displaying, varying and storing steps for other uncorrected pictures, and utilizing the stored signals to produce color-corrected video signals.

16. A method as in claim 15 including the steps of performing said varying and storing steps for the color balance, and/or hue and/or saturation factors of said uncorrected video signals.

17. A method as in claim 15 including the steps of performing said varying and storing steps for the gain and/or pedestal and/or gamma factors of said luminance signal.

18. A method as in claim 15 including the step of utilizing selected ones of the stored corrected signals to correct another picture, and storing selected ones of said signals as corrections for said other picture.

19. A device as in claim 1 in which said primary color component signals represent red, green and blue signals, and including means for rectifying said difference signals, and means for selectively summing the output signals from said rectifying means and thereby producing signals representative of the blue, cyan, green, yellow, red and magenta hues of said video signals.

20. In or for a color video signal processing system including means for developing primary color component signals representative of color picture images, gamma control means for separately controlling the gamma factor of each of said color component signals, and variable gain control means for controlling the amplitude of said color component signals, luminance means for developing a luminance signal for said images, said luminance means comprising circuit means for combining the outputs of said gain control means prior to their being altered by said gamma control means in order to form a luminance signal.

21. A device as in claim 20 including further gamma control means for controlling the gamma factor of said luminance signal.

22. A device as in claim 20 in which said primary color component signals are red, green and blue signals, said gain control means comprising a gain control circuit coupled to receive each of said primary color component signals, a pedestal control circuit connected to each of said gain control circuits, said gamma control means comprising a gamma control circuit connected to each of said pedestal control circuits, said luminance means comprising a conductor for conducting the outputs of said gain control circuits to a resistor network for combining said outputs in accordance with a predetermined ratio, and gain, pedestal and gamma control circuits connected to receive the output of said resistor network.

* * * * *

UNITED STATES PATENT AND TRADEMARK OFFICE
CERTIFICATE OF CORRECTION

PATENT NO. : 4,410,908
DATED : October 18, 1983
INVENTOR(S) : Belmares-Sarabia et al.

It is certified that error appears in the above-identified patent and that said Letters Patent are hereby corrected as shown below:

Column 11, Claim 8, line 30, insert a comma --,-- after "green";

Column 12, cancel entire Claims 20, 21, and 22.

On the title page, "22 Claims" should read -- 19 Claims --.

Signed and Sealed this

Thirty-first Day of January 1984

[SEAL]

Attest:

GERALD J. MOSSINGHOFF

Attesting Officer    Commissioner of Patents and Trademarks